United States Patent
Leng

(10) Patent No.: US 10,159,335 B2
(45) Date of Patent: Dec. 25, 2018

(54) COMPOSITE SUCTION PLASTIC PANEL

(71) Applicant: NEW-TEC INTEGRATION (XIAMEN) CO., LTD., Xiamen, Fujian (CN)

(72) Inventor: Luhao Leng, Xiamen (CN)

(73) Assignee: New-Tec Integration (Xiamen) Co., Ltd., Xiamen, Fujian (CN)

( * ) Notice: Subject to any disclaimer, the term of this patent is extended or adjusted under 35 U.S.C. 154(b) by 35 days.

(21) Appl. No.: 14/431,066

(22) PCT Filed: Sep. 24, 2013

(86) PCT No.: PCT/CN2013/084103
§ 371 (c)(1),
(2) Date: Mar. 25, 2015

(87) PCT Pub. No.: WO2014/048303
PCT Pub. Date: Apr. 3, 2014

(65) Prior Publication Data
US 2015/0250302 A1  Sep. 10, 2015

(30) Foreign Application Priority Data
Sep. 25, 2012 (CN) .......................... 2012 1 0362997

(51) Int. Cl.
*A47B 13/08* (2006.01)
*B32B 3/30* (2006.01)
(Continued)

(52) U.S. Cl.
CPC ................ *A47B 13/08* (2013.01); *B32B 3/30* (2013.01); *B32B 27/08* (2013.01); *B32B 27/302* (2013.01);
(Continued)

(58) Field of Classification Search
CPC ........... A47B 13/08; A47B 3/087; B32B 3/30; B32B 27/08; B32B 27/32; B32B 27/302;
(Continued)

(56) References Cited

U.S. PATENT DOCUMENTS 4,533,240 A * 8/1985 Jasperson ................. G03F 9/00
355/125
4,606,278 A * 8/1986 Shuert ................ B65D 19/0012
108/53.3
(Continued)

FOREIGN PATENT DOCUMENTS

CN          2530518 Y     1/2003
CN          1448971 A    10/2003
(Continued)

*Primary Examiner* — Donald J Loney
(74) *Attorney, Agent, or Firm* — Edward E. Sowers; Brannon Sowers & Cracraft PC

(57) ABSTRACT

The present invention provides a composite suction plastic panel, which comprises a substantially planar and single-layered surface plate and a bottom plate formed by plastic suction mold method, the bottom plate is disposed with a plurality of raisings to support the panel and is adhesively connected to the bottom surface of the surface plate, the top surface of the surface plate is disposed with grooves, the grooves are arranged corresponding to the positions of the vents in the plastic suction mould. The plastic suction mark of the vents is left in the grooves at the time of formation, so that the surface of the plastic surface plate is flat and smooth without a mark of vents.

8 Claims, 7 Drawing Sheets

(51) Int. Cl.
  *B32B 27/08* (2006.01)
  *B32B 27/30* (2006.01)
  *B32B 27/32* (2006.01)
  *A47B 3/087* (2006.01)

(52) U.S. Cl.
  CPC .............. *B32B 27/32* (2013.01); *A47B 3/087* (2013.01); *B32B 2250/24* (2013.01); *B32B 2479/00* (2013.01); *Y10T 428/2457* (2015.01); *Y10T 428/24612* (2015.01)

(58) Field of Classification Search
  CPC ............. B32B 2250/24; B32B 2479/00; Y10T 428/2457; Y10T 428/24612
  See application file for complete search history.

(56) References Cited

U.S. PATENT DOCUMENTS

| | | | | |
|---|---|---|---|---|
| 5,967,056 | A * | 10/1999 | Plante | B65D 19/0038 108/56.1 |
| 6,029,962 | A * | 2/2000 | Shorten | A43B 13/181 267/145 |
| 2005/0103239 | A1* | 5/2005 | Neunzert | A47B 3/087 108/132 |
| 2008/0276567 | A1* | 11/2008 | Rapaz | E04C 2/20 52/792.11 |

FOREIGN PATENT DOCUMENTS

| | | |
|---|---|---|
| CN | 103284472 A | 9/2013 |
| JP | S53129258 A | 11/1978 |

\* cited by examiner

COMPOSITE SUCTION PLASTIC PANEL

FIELD OF THE INVENTION

The present invention relates to a plastic panel, especially to a panel made by plastic suction method.

BACKGROUND OF THE INVENTION

Panels are used in various furniture at home or in the office, tables are most common furniture, table panel are usual panels. Early table tops are made of wood, for example, wooden boards, fiber boards and chipboards. For these table tops made of wood, on one hand, cutting wood is recently limited that it reduces the usage of wood, on another hand, the wood is limited in the usage range due to some defects itself, for example, a table top made of medium density fiberboard is heavy to move, or a tablet top made of chipboard is easy to damage due to its weak strength, wooden table tops are weak in moisture resistance, inconvenient in cleaning, high in cost. Another kind of early table tops are made of plastic, however, the solid plastic boards are very heavy to move, so that they are rarely used.

To solve above problems of table tops, the applicant designed a suction plastic table top. The suction plastic table top comprise a panel and a bottom plate made by plastic suction method, the bottom plate is disposed with a plurality of raising to support the panel, the plastic bottom plate is adhesively connected to the bottom surface of the plastic panel by glue, the periphery edges of the plastic bottom plate and the plastic panel coincide to be an entirety by glue. Although the table top composed of panel and bottom plate is hollow, it has well strength.

During manufacturing large plastic panel, the plastic suction mould has to be disposed with vents, so that the heated softened plastic panel is sucked to the mould, following is cooling forming. Therefore, the plastic panel has vents marks at the time of forming, thus making the surface of the plastic panel rough and uneven, the panels are not attractive enough.

SUMMARY OF THE INVENTION

The present invention is provided with a composite suction plastic panel to overcome above disadvantages, it hides the vents of the plastic panel.

The technical proposal of the present invention to solve the technical problem is that:

A composite suction plastic panel, comprising panel and bottom plate formed by plastic suction method, the bottom plate is disposed with a plurality of raisings to support the panel and is adhesively connected to the bottom surface of the panel, wherein the top surface of the plastic panel is disposed with concaves, the concaves are arranged corresponding to the positions of the vents in the plastic suction mould.

The cross section of the groove is cone-shaped.

The suction plastic vents are arranged on the side wall of the groove.

The concaves form a line or a pattern of the panel.

In another preferred embodiment, the thickness of the suction plastic panel is 0.8-1.4 mm In another preferred embodiment, the thickness of the suction plastic panel is 1.0-1.2 mm In another preferred embodiment, the thickness of the suction plastic panel is 1.2 mm.

In another preferred embodiment, it comprises two concaves that are spaced arranged in a line.

In another preferred embodiment, it comprises two concaves, one concave is petal shaped, the other one is circular shaped and is arranged in the petal shaped concave.

In another preferred embodiment, it comprises a plurality of concaves gridded arranged.

Compared to the existing technology, the technical proposal of the present invention has following advantages:

1. the top surface of the panel is disposed with concaves, the concaves are arranged in a position corresponding to the vents of the plastic suction mould, the plastic suction mark of the vents leaves in the concave at the time of formation, so that the surface of the plastic panel is flat and smooth without a mark of vents. The concaves can form a line or a pattern to be a composition of the tablet top as users' need.

2. to remove the vent marks of the plastic panel, it usually increases the thickness of the plastic panel in existing known technology, however, it increases the manufactory cost, the vent marks can not be totally removed. The composite suction plastic table top of the present invention hides the vent mark on the surface of the plastic panel, so that the plastic panel can be made thin, the composite structure of the present invention ensures the strength of the composite board.

3. the thickness of the plastic panel is 0.8-1.4 mm, it can effectively reduce the manufactory cost. Preferred the thickness is 1.0-1.2 mm, it can not only reduce the manufactory cost, but also make the forming art simple. Best is 1.2 mm, it moreover ensures the strength of the plastic panel.

4. the cross section of the concaves is cone-shaped, so that it is helpful that the plastic panel is contacted with the plastic suction mould at the time of forming, thus improving the flatness of the plastic panel.

5. as the vent marks are hidden on the surface of the plastic panel, the composite suction plastic table top of the present invention has simple and attractive appearance.

6. the concaves have unfixed number and pattern in the flat surface, so that it can form any kinds of patterns to make the products attractive.

BRIEF DESCRIPTION OF THE DRAWINGS

The present invention will be further described with the drawings and the embodiments.

DETAILED DESCRIPTION OF THE EMBODIMENTS

The first embodiment

Figure 1:
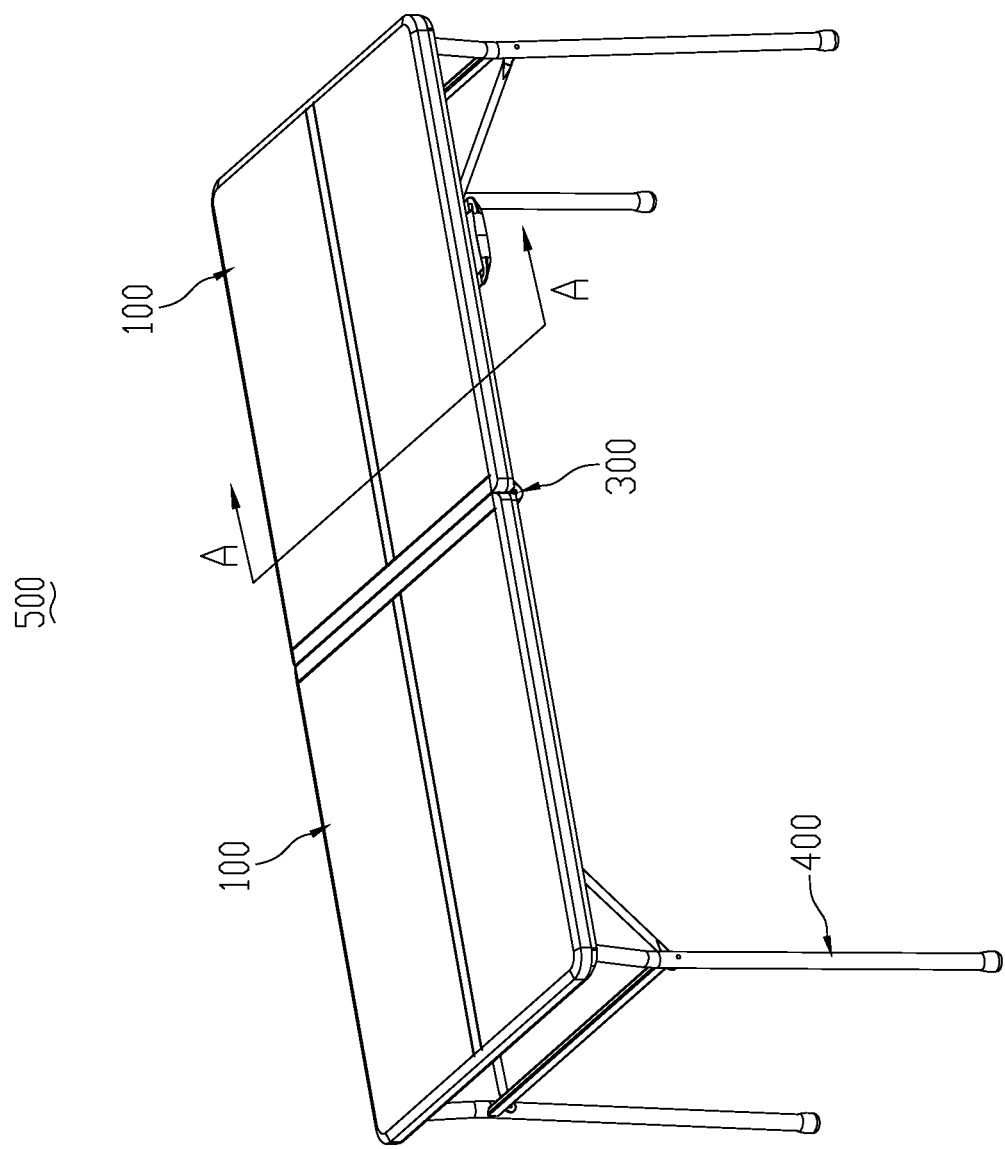
FIG. 1 illustrates a schematic diagram of a composite suction plastic table top of the present invention applied in a folding table.
Figure 2:
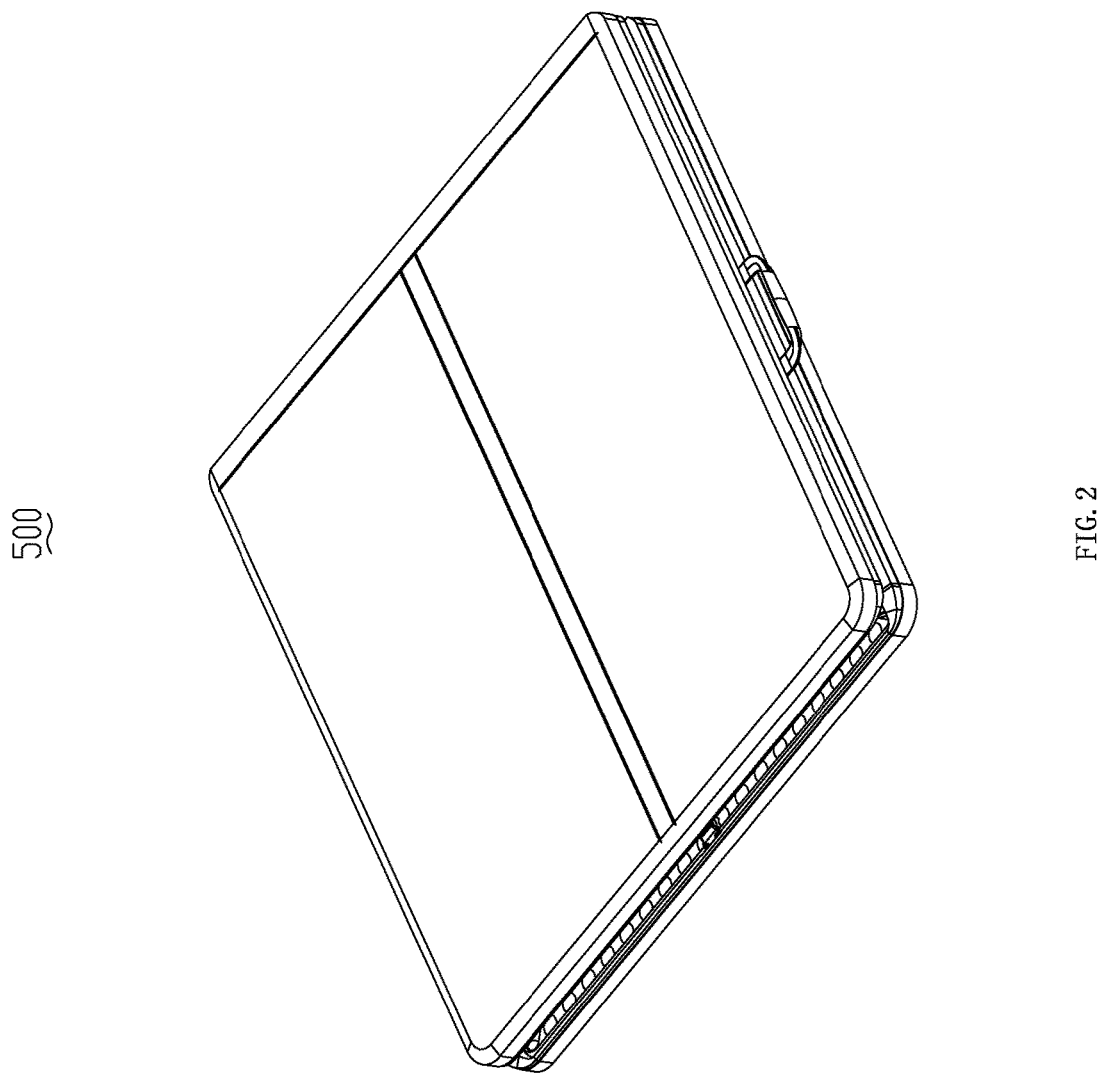
FIG. 2 illustrates a schematic diagram of the folding table of FIG. 1 in folding position.

Referring to FIG. 1 and FIG. 2, a composite suction plastic panel is a table top, two composite suction table tops 100 of the present invention are hinged together by a hinge 300, then assembled with a folding leg frame 400, thus forming a folding table 500.

Figure 3:
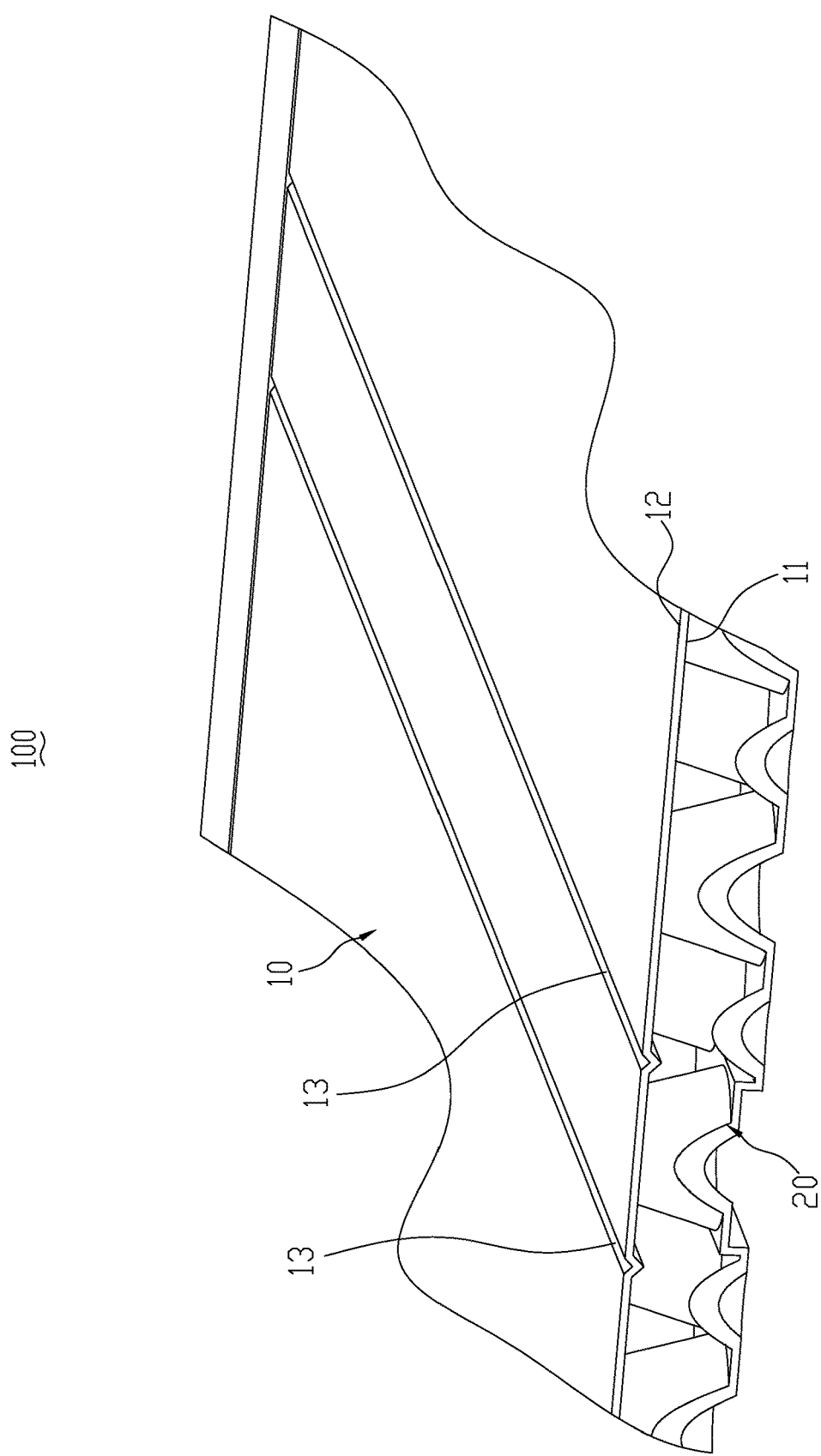
FIG. 3 illustrates a sectional diagram of FIG. 1 in A-A line.
Figure 4:
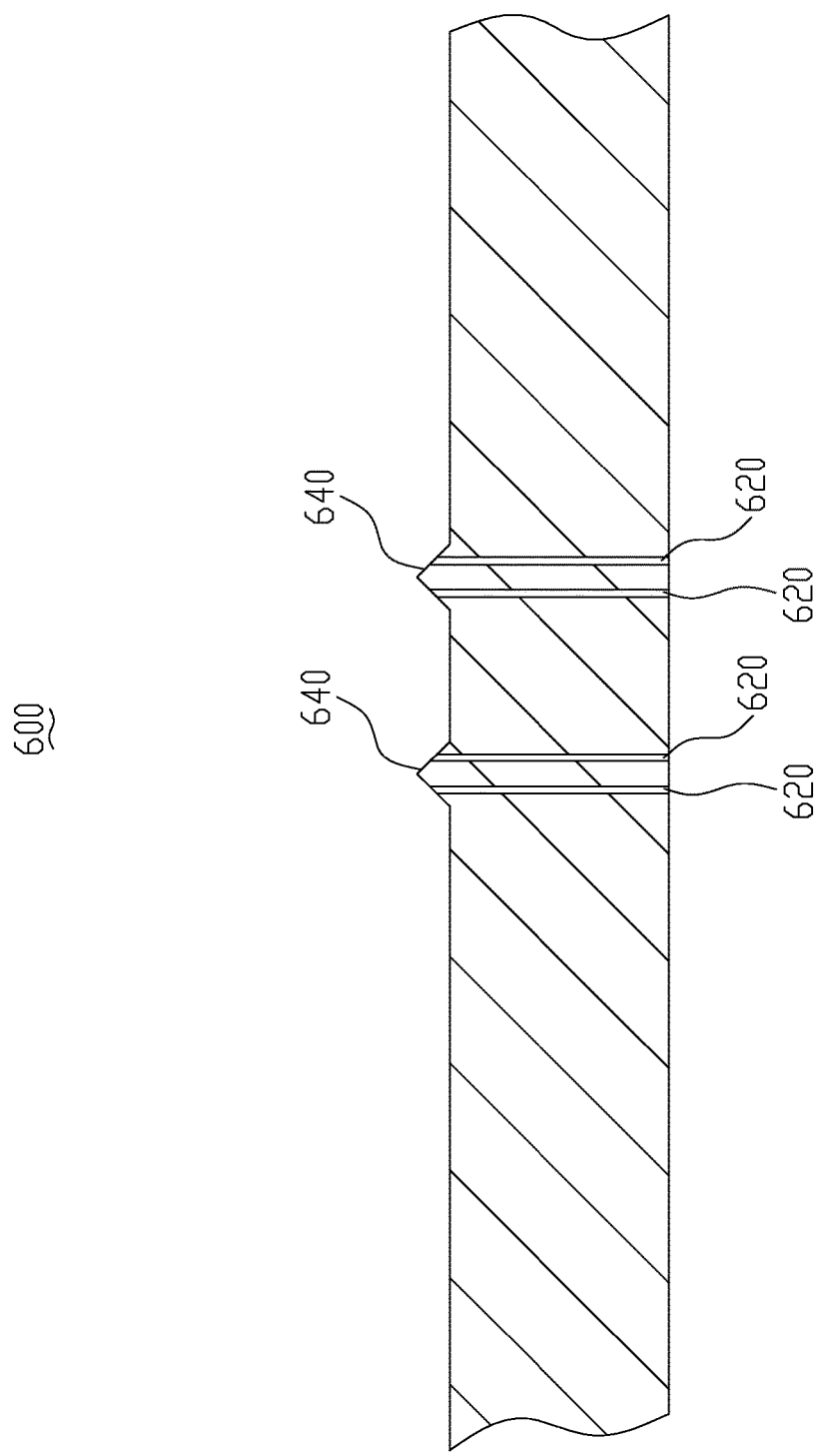
FIG. 4 illustrates a partial sectional diagram of the plastic suction mold.

Referring to FIG. 3 and FIG. 4, the composite suction plastic table top 100 comprises a panel 10 and a bottom plate 20. the bottom plate 20 is disposed with a plurality of raisings that support the panel 10, the bottom plate 20 is adjectively connected to the bottom surface 11 of the plastic panel 10.

The panel 10 and the bottom plate 20 are made of plastic, PP, ABS or other plastic grains, by plastic suction method. The top surface of the panel 10 is disposed with two grooves 13 in a line, two grooves 13 are spaced arranged or crossed arranged, other arrangement like a line or a pattern are available according to users' favor.

Figure 5:
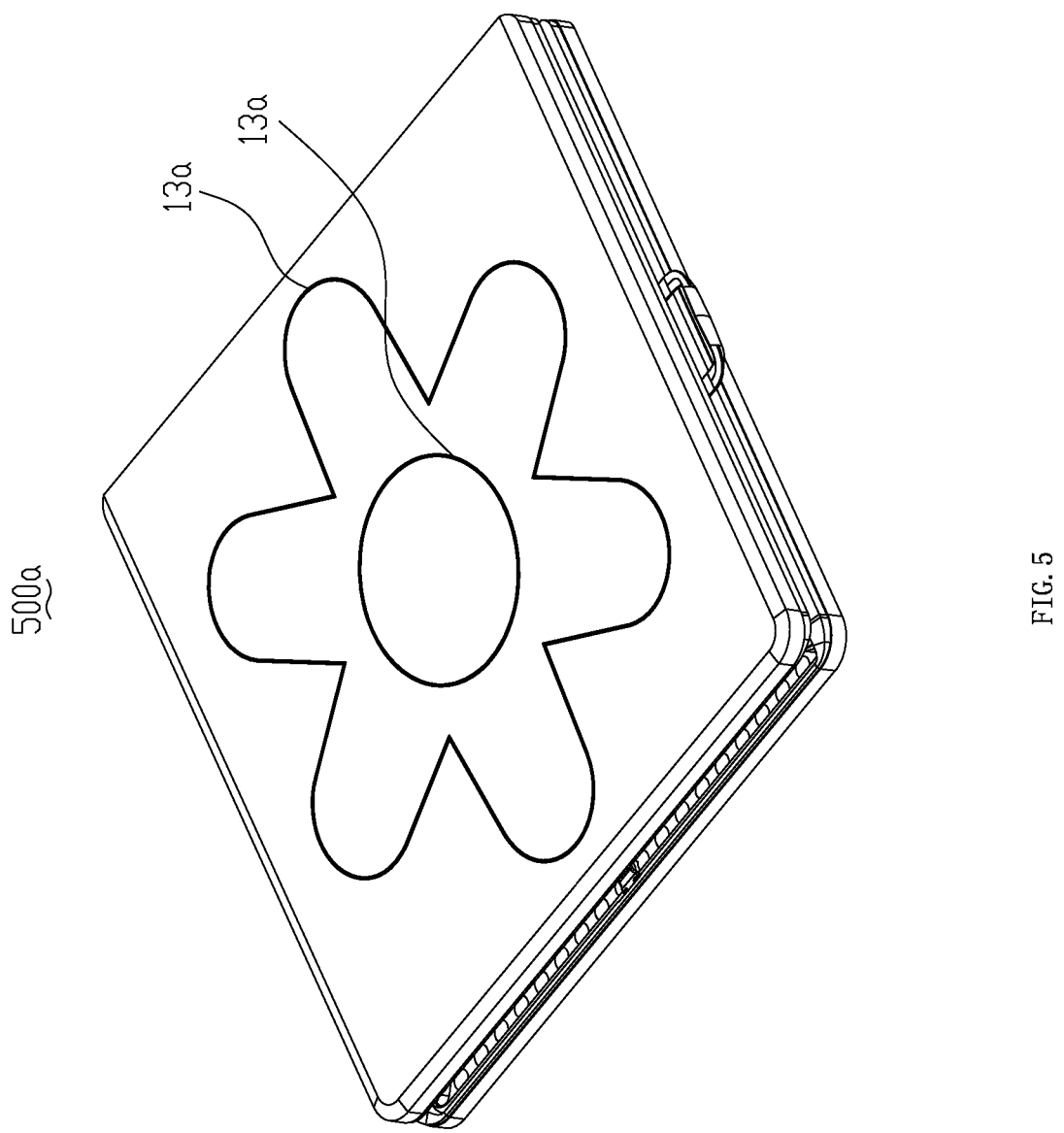
FIG. 5 illustrates a schematic diagram of a second folding table of the present invention.

The cross section of the grooves 13 is cone-shaped, other shapes like rectangular are available. The grooves 13 are arranged corresponding to the positions of the vents 620 of the plastic suction mould 600, so that the plastic suction mark of the vents 620 leaves in the grooves 13 at the time of formation. The plastic suction mould 600 is convex with two cone-shaped ribs 640 in the positions of the grooves 13, the vents 620 is disposed in the ribs 640. The thickness of the panel 10 is 0.8-1.4 mm, preferred 1.0-1.2 mm, best is 1.2 mm The second embodiment Referring to FIG. 5, it illustrates a schematic diagram of a second kind of folding table 500a, the composite suction plastic panel of this embodiment is also a table top, the folding table 500a has difference from the first embodiment; the groove 13a is petal shaped, the groove 13a is arranged in a position corresponding to vent 620 of the plastic suction mould 600.

The third embodiment

Figure 6:
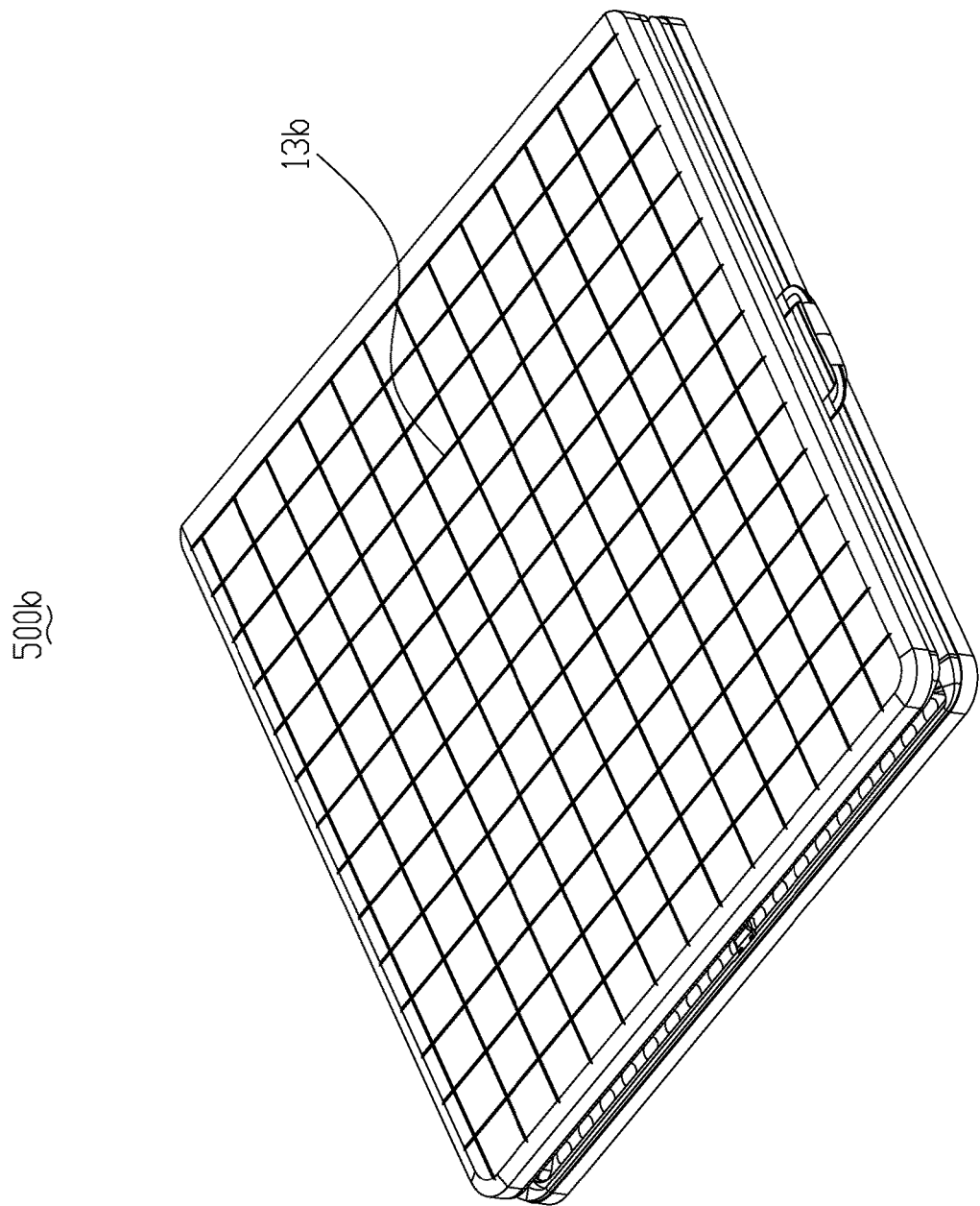
FIG. 6 illustrates a schematic diagram of a third folding table of the present invention.

The composite suction plastic panel of this embodiment is also a table top, referring to FIG. 6, it illustrates a schematic diagram of a third kind of a folding table 500b, the difference from the first embodiment is that: this embodiment has a plurality of grooves 13b gridded arranged.

The fourth embodiment

Figure 7:
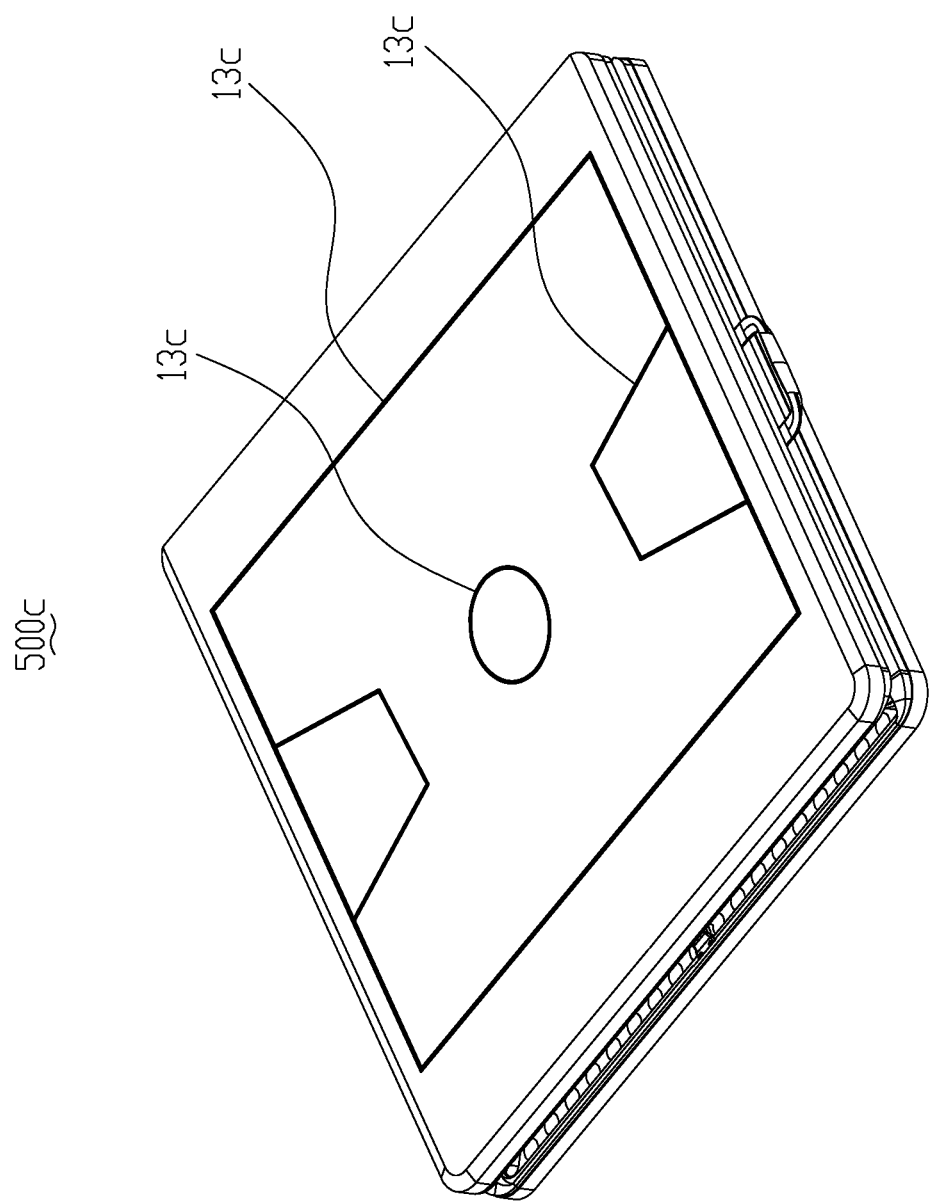
FIG. 7 illustrates a schematic diagram of a fourth folding table of the present invention.

The composite suction plastic panel of this embodiment is also a table top, referring to FIG. 7, it illustrates a schematic diagram of a fourth kind of a folding table 500c, the difference from the first embodiment is that: this embodiment has a plurality of grooves 13c arranged like a stadium.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided that the top surface of the panel is disposed with grooves, the grooves are arranged in a position corresponding to the vents of the plastic suction mould, the plastic suction mark of the vents leaves in the grooves at the time of formation, so that the surface of the plastic panel is flat and smooth without a mark of vents.

The invention claimed is:

1. A table comprising table lags and a table top, the table top comprising:
    a single-layered planar surface plate defining a thickness of 0.8-1.4 mm, and
    a bottom plate having a plurality of raisings supporting the surface plate, the surface plate having a top surface and a bottom surface, the raisings of the bottom plate adhesively connected to the bottom surface of the surface plate, the top surface of the planar surface plate having a groove defining a depth, the depth of the groove being equal to or smaller than the thickness of the planar surface plate.

2. The table according to claim 1, wherein a cross section of the groove is cone-shaped.

3. The table according to claim 1, wherein the groove is arranged to encompass positions of vents in a plastic vacuum suction mold used in the plastic suction mold method.

4. The table according to claim 3, wherein the vents correspond to positions on a side wall of the groove.

5. The table according to claim 1, wherein the groove forms a line or a pattern on the top surface of the surface plate.

6. The table according to claim 5, wherein the top surface of the surface plate comprises two linear grooves spaced apart.

7. The table according to claim 5, wherein the top surface of the surface plate comprises two grooves, one of the two grooves is petal shaped, the other is circular shaped and arranged inside the petal shaped concave.

8. The table according to claim 5, wherein the top surface of the surface plate comprises a plurality of grooves arranged in grids.

* * * * *